Figure 1:
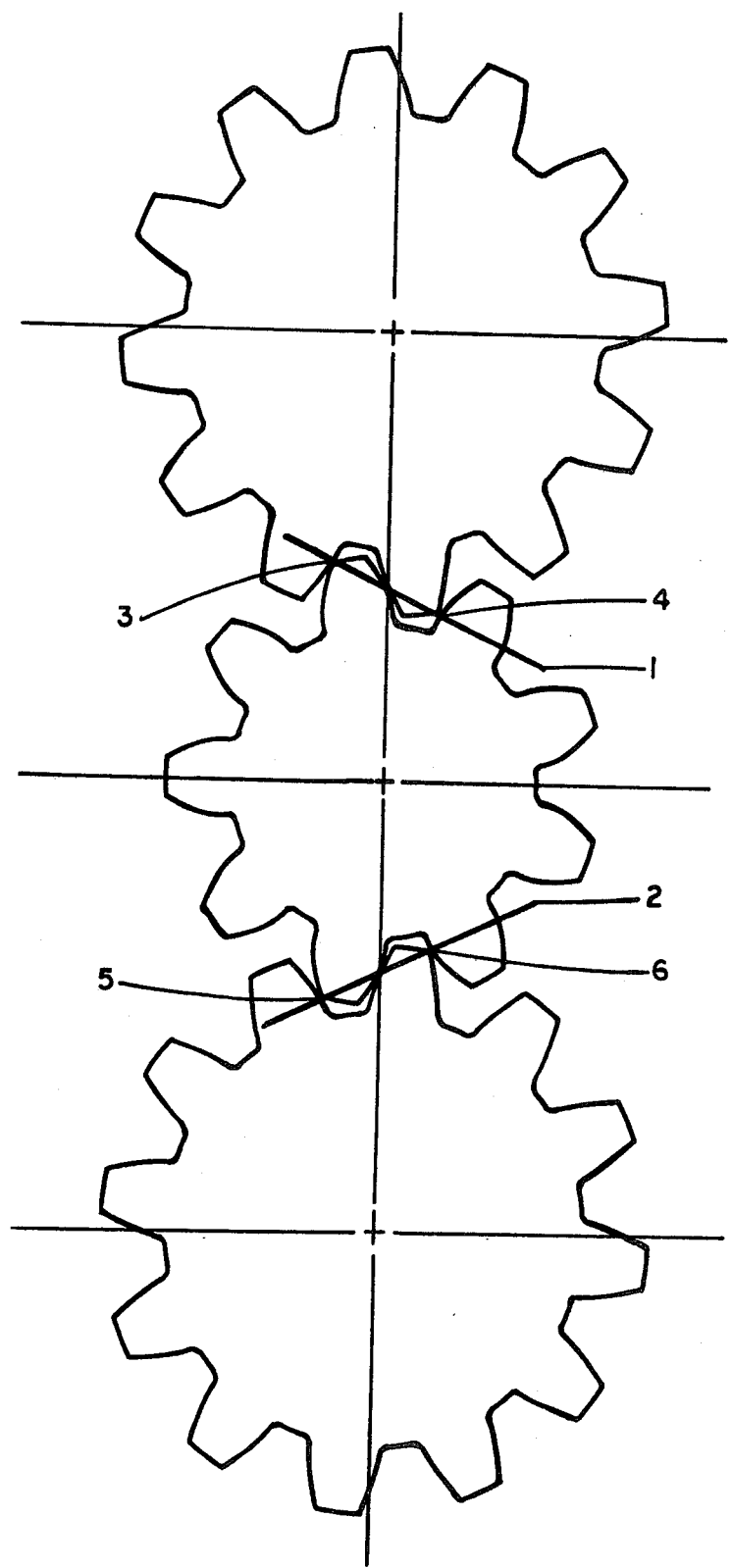

United States Patent [19]

McCaw

[11] 4,244,243
[45] Jan. 13, 1981

[54] VARIABLE LEVERAGE GEARING

[76] Inventor: Thomas M. McCaw, 512 Lingle, Lafayette, Ind. 47901

[21] Appl. No.: 969,832

[22] Filed: Dec. 15, 1978

[51] Int. Cl.³ .................... F16H 1/40; F16H 55/17; F16H 1/14

[52] U.S. Cl. .................... 74/713; 74/423; 74/459.5

[58] Field of Search .................... 74/713, 459.5, 460, 74/462, 423, 424; 29/159.2

[56] References Cited

U.S. PATENT DOCUMENTS

| | | | |
|---|---|---|---|
| 1,295,231 | 2/1919 | Stewart et al. | 74/459.5 |
| 1,455,706 | 5/1923 | Bower et al. | 74/459.5 |
| 1,755,102 | 4/1930 | Croft | 74/459.5 |
| 1,763,177 | 6/1930 | Perkins | 74/459.5 |
| 1,818,554 | 8/1931 | Head | 74/459.5 |
| 1,856,443 | 5/1932 | Stoeckicht | 74/423 |
| 2,009,915 | 7/1935 | Davis | 74/459.5 X |
| 2,436,276 | 2/1948 | Wildhaber | 74/459.5 |
| 2,696,125 | 12/1954 | Saari | 74/459.5 |
| 2,971,788 | 2/1961 | Wildhaber | 74/459.5 |
| 3,703,108 | 11/1972 | McCaw | 74/459.5 |
| 4,031,770 | 6/1977 | Ishikawa | 74/462 |

FOREIGN PATENT DOCUMENTS

| | | | |
|---|---|---|---|
| 1625599 | 8/1970 | Fed. Rep. of Germany | 74/459.5 |
| 2430645 | 1/1976 | Fed. Rep. of Germany | 74/462 |
| 526821 | 10/1921 | France | 74/462 |

OTHER PUBLICATIONS

Gleason, "Zero Bevel Gear System", 10 pages, 1954.

*Primary Examiner*—Leslie Braun
*Attorney, Agent, or Firm*—Woodling, Krost & Rust

[57] ABSTRACT

A bevel gear set for particular use in providing a variable leverage torque proportioning effect in a differential. The bevel gear set includes a gear with bevel teeth and a pinion with bevel teeth which mesh and which meshing teeth have lines of contact. The lines of contact have midpoints or midportions which coincide with a given plane of rotation of the gear which has the bevel teeth as distinguished from the pinion.

6 Claims, 4 Drawing Figures

VARIABLE LEVERAGE GEARING

The invention relates to variable leverage bevel gearing preferably used in vehicle differentials to give a torque proportioning effect.

Torque proportioning variable leverage gearing has been previously described in U.S. Pat. No. 2,436,276, No. 2,009,915 and No. 3,703,108. In the previously described variable leverage gearing the torque proportioning effect obtainable is limited to approximately 1.65 for U.S. Pat. No. 2,436,276 and No. 2,009,915 and to approximately 2.0 for U.S. Pat. No. 3,703,108. In the present invention, a torque proportioning effect of 2.5 is obtainable.

In considering the known state of the art of variable leverage gearing, the present invention has as its objective to provide bevel gearing to be used in differentials that will give the highest possible torque proportioning effect, that is interchangeable with standard bevel differential gearing, that is simple to design for desired characteristics, that is easy and economical to produce on standard machinery and that will have greater durability than other differential gears.

The following advantages are achieved over previously described variable leverage gearing.

a. Relative to U.S. Pat. No. 2,436,276 and No. 2,009,915
1. Lower surface compressive stress because of longer lines of contact.
2. Lower bending stress because of longer and shallower teeth.
3. Lower pinion bore pressure and better mounting stability because of longer pinions.
4. Higher torque proportioning effect, i.e., 2.5 VS 1.65.
5. Teeth are cut on standard gear cutting machines.
6. Torque proportioning effect does not wear out.
7. Smooth motion is transmitted by the gear set.
8. Teeth contact pressure is constant for pinion torsional equilibrium.

b. Relative to U.S. Pat. No. 3,703,108
1. The pinions are in torsional equilibrium with constant contact pressure on the teeth.
2. The torque proportioning effect is higher, i.e.; 2.5 VS 2.0.
3. The desired characteristics are more easily calculated.

To better understand the invention it is helpful to describe the fundamental differences over the prior art.

a. The variable leverage effect of gearing in U.S. Pat. No. 2,436,276 and No. 2,009,915 occurs in the plane of rotation of the pinions using elongated teeth with specially formed profiles. Tooth contact pressure varies through each tooth mesh cycle.

b. The variable leverage effect of U.S. Pat. No. 3,703,108 occurs in the plane of rotation of both pinion and side gear using double face cone structures for both pinions and side gears, i.e.; one partial face cone apex separated from the other partial face cone apex. There is some variation in contact pressure on the teeth.

c. The variable leverage effect in the present invention occurs only in the plane of rotation of the side gear using modified standard bevel pinion and gear addendum and dedendum proportions and blank geometry. Tooth contact pressure is constant through the tooth mesh cycles.

The major improvements and benefits of variable leverage occurring in the side gear plane of rotation and of constant tooth contact pressure with pinion torsional equilibrium are:

a. The tooth profiles are loaded uniformly through the mesh cycles which eliminates areas of excessive stress and wear on the teeth.

b. The pinions exert uniform pressure on the mounting and thrust surfaces which eliminates excessive wear on pinion bores and thrust surfaces.

c. The torque proportioning effect is higher.

d. The torque proportioning effect will not wear out.

Figure 2:
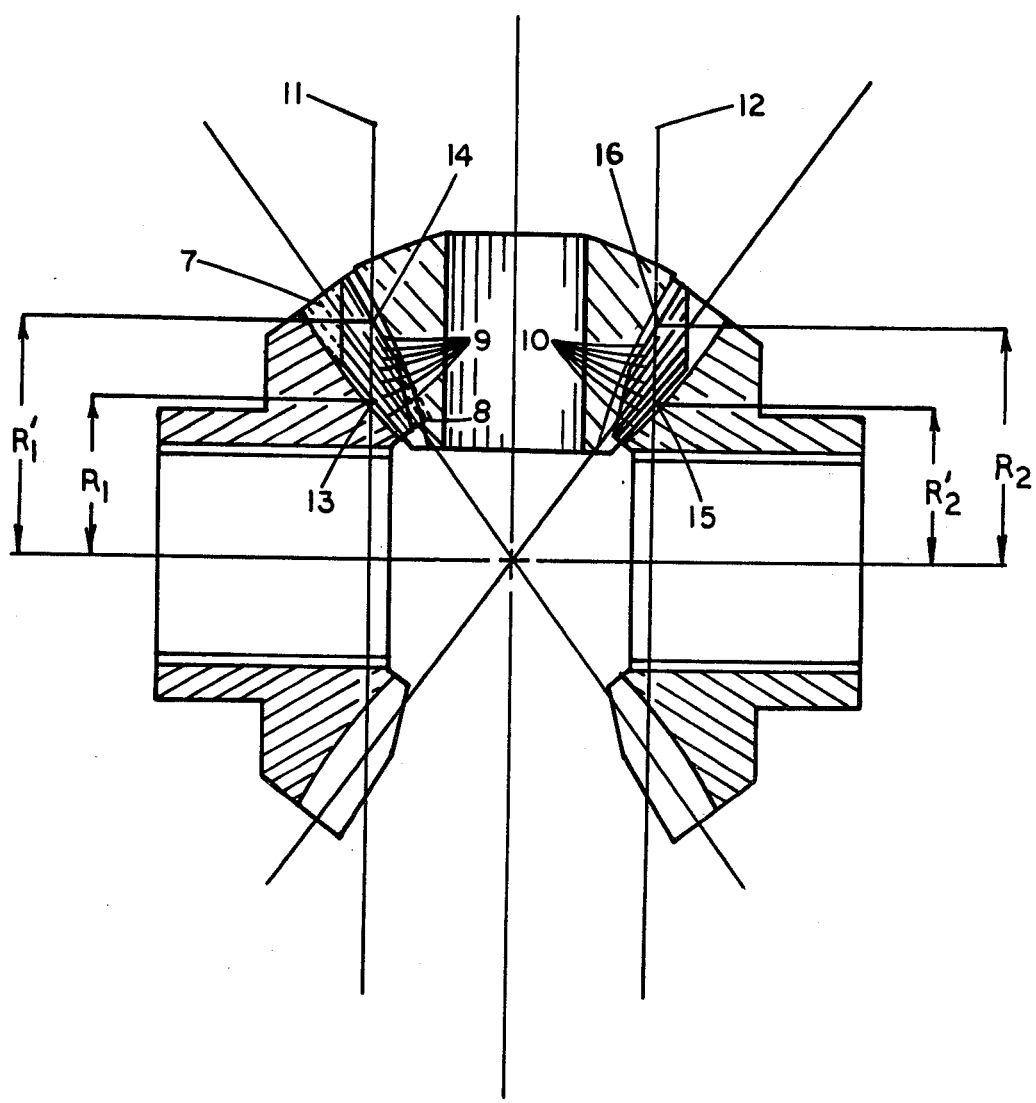
Figure 3:
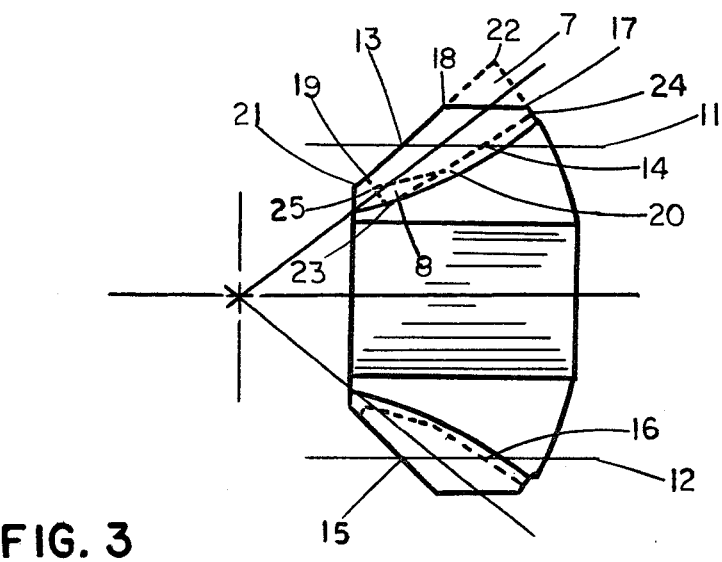
Figure 4:
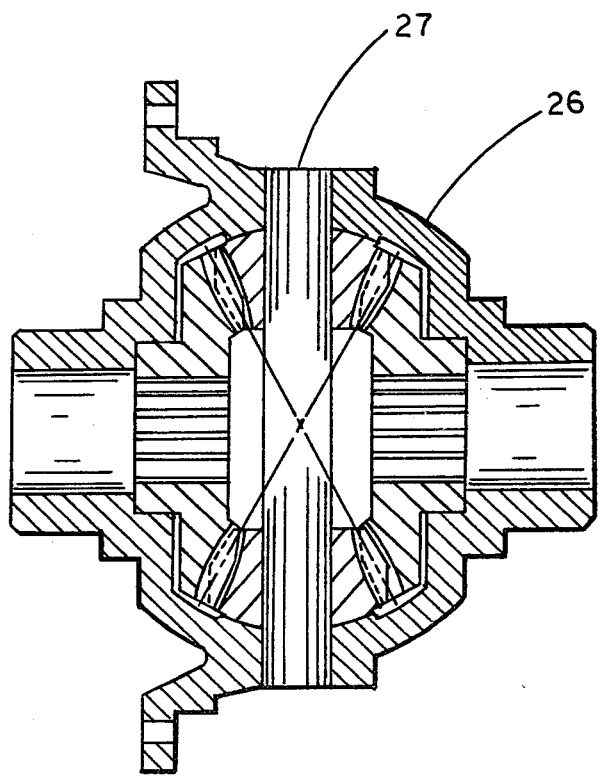

The preferred form of the invention is illustrated in FIG. 1 through FIG. 4. FIG. 1 is a schematic showing the relationship of pinion teeth contact with side gear teeth required for maximum variable leverage effect and FIG. 2 shows the modification of pinion and side gear blank geometry to provide variable leverage in the plane of rotation of the side gear and constant contact pressure for pinion torsional equilibrium. FIG. 3 is an exploded view of the gears of FIG. 2. FIG. 4 shows a cross-sectional side view of a pair of pinion and side gears modified as described in FIG. 2 and contained within a housing.

FIG. 1 shows a 9 tooth 25° pressure angle pinion engaging two 12 tooth gears with addendum and dedendum proportions to give a contact ratio of 1.0. The lines of action with respective gears are shown at 1 and 2. The addendum of the pinion teeth has been selected so that in the angular position of the pinion shown in FIG. 1 contact will occur at 3 and 4 between pinion and gear teeth of one gear and at 5 and 6 between pinion and gear teeth of the other gear. The pinion is obviously in torsional equilibrium. If the pinion is rotated slightly clockwise as seen in FIG. 1, contact will cease at 4 and 5. If the pinion is rotated counterclockwise, contact will cease at 3 and 6. With either clockwise or counterclockwise rotation from the symmetrical contact position, simultaneous contact with gear teeth will occur at the top of one pinion tooth and at the bottom of the other contacting pinion tooth. With constant contact pressure, the pinion is no longer in torsional equilibrium in the plane of FIG. 1. However, torsional equilibrium of the pinion with constant contact pressure is obtained under all contact conditions by modifying the pinion and gear blank geometry as shown in FIG. 2.

The pinon and two gears shown in plane section in FIG. 1 are shown in bevel gear cross section in FIG. 2. Dotted lines 7 show the portion of a standard pinion blank trimmed away and dotted lines 8 show a portion of a bevel side gear blank trimmed away. The pinion and side gear blanks are respectively trimmed away at 7 and 8 so that the midpoints of the lines of contact 9 with one side gear and 10 with the other side gear will coincide with lines 11 and 12 respectively. Lines 11 and 12 represent the planes of rotation of the respective side gears and are equidistant from the center line of the pinion. It is apparent that the lines of contact 9 on one side gear will produce turning moments which are equal and opposite to the turning moments produced by the lines of contact 10 on the other side gear and the pinion is therefore in torsional equilibrium under all contact conditions so long as lines of contact 9 and 10 are of equal pressure.

The initial contact condition illustrated in FIG. 1 at 3 and 4 with one gear and 5 and 6 with the other gear is shown in FIG. 2 as 13 and 14 with one side gear and 15 and 16 with the other side gear respectively. Slight rotation of the pinion in one direction will cause contact to cease at 14 and 15 and the torque produced in the one side gear by contact 13 will be proportional to $R_1$ and torque produced in the other side gear by contact 16 will be proportional to $R_2$. Slight rotation of the pinion in the opposite direction will cause contact to cease at 13 and 16 and torque produced in the one side gear by contact 14 will be proportional to $R_1'$ and torque produced in the other side gear by contact 15 will be proportional to $R_2'$. The conditions of variable leverage in the plane of the side gear rotation are illustrated by $R_1$, $R_1'$ for one side gear and $R_2$, $R_2'$ for the other side gear.

It is apparent that the trimming of the respective gear and pinion blanks produces the condition that lines of contact will occur only between the toe and the heel portions of the pinion and gear teeth.

Although the conditions described in FIG. 1 and FIG. 2 are obtained with 9 tooth pinions mating with 12 tooth side gears of 25° pressure angle and contact ratio of 1.0, the functional gearing is not limited to these parameters. Rather, the pinions may have 7 or more teeth but the gears must have a number of teeth divisible by the number of pinions. The practical contact ratio should be somewhat greater than 1.0 to provide for manufacturing and assembly tolerances. The pressure angle may be between $22\frac{1}{2}°$ and 30°. Pinions and side gears with lower pressure angles may have serious undercutting of the teeth and resultant loss of strength, whereas higher pressure angles will produce teeth that are pointed. The torque proportioning effect will range from approximately 2.25 for $22\frac{1}{2}°$ pressure angle to approximately 2.5 for 30° pressure angle.

FIG. 3 shows in detail the pinion member of FIG. 2. The layout of the gearing is accomplished in the following manner: Using accepted layout procedures for bevel gears, the pinion face line 21-22 and the gear face line 23-24 are established using addendum values for the pinion and for the gear to obtain the contact conditions described in FIG. 1. The pinion trimming 7 is established at point 17, which is the point of contact indicated at 4 and 6 of FIG. 1. The pinion outside diameter surface described by line 17-18 is cylindrical relative to the pinion axis. Point 13, which is equidistant between points 18 and 19 on the pinion face line, is a point on line 11 which is drawn parallel to the pinion axis. Point 14 is also on line 11. Trimming 8 of the gear is established between points 20 and 25 by the conditions that point 20 is the same distance from point 14 as point 24 and point 25 is the point of contact indicated at 3 and 5 of FIG. 1 along 19-23.

Trimming of the respective gear and pinion faces as described, produces the claimed contact conditions and the variable leverage effect in the plane of side gear rotation.

FIG. 4 shows the gearing of FIGS. 1, 2 and 3 assembled in a housing 26. The side gears of FIG. 2 are rotatively mounted in housing 26 in meshing engagement with the pinions of FIG. 2 which are mounted rotatively on trunnion 27, which is fixedly attached to housing 26.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

What is claimed is:

1. A variable leverage torque proportioning differential including in combination a housing, first and second side gears each having bevel teeth and each being rotatively mounted in said housing, at least one pinion having bevel teeth and being rotatively mounted in said housing, said pinion bevel teeth being in meshing engagement with said bevel teeth of said first and second side gears, said side gear bevel teeth and said pinion bevel teeth having lines of contact, said lines of contact having midpoints which coincide with a given plane of rotation of each of said side gears.

2. A variable leverage torque proportioning differential as claimed in claim 1 wherein said midpoints of said lines of contact are equidistant from the axis of said at least one pinion.

3. A variable leverage torque proportioning differential as claimed in claim 1 wherein said pinion and said first and second side gears have toe portions and heel portions and lines of action, said lines of contact occur simultaneously along said line of action with said first side gear from said toe portion to said heel portion and with said second side gear from said heel portion to said toe portion.

4. A bevel gear set including in combination a gear having bevel teeth and a pinion having bevel teeth, said gear bevel teeth being in meshing engagement with said pinion bevel teeth, said gear bevel teeth and said pinion bevel teeth having lines of contact, said lines of contact having midpoints which coincide with a given plane of rotation of said gear having said bevel teeth.

5. A bevel gear set as claimed in claim 4 wherein said midpoints of said lines of contact are equidistant from the axis of said pinion.

6. A bevel gear set as claimed in claim 4 wherein said pinion and said gear have a toe portion and a heel portion and a line of action, said lines of contact occur along said line of action from said toe portion to said heel portion.

* * * * *